US006504941B2

(12) United States Patent
Wong

(10) Patent No.: US 6,504,941 B2
(45) Date of Patent: *Jan. 7, 2003

(54) METHOD AND APPARATUS FOR DIGITAL WATERMARKING OF IMAGES

(75) Inventor: Ping Wah Wong, Sunnyvale, CA (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/070,470

(22) Filed: Apr. 30, 1998

(65) Prior Publication Data

US 2001/0046307 A1 Nov. 29, 2001

(51) Int. Cl.$^7$ .................................................. G06K 9/00
(52) U.S. Cl. ...................................................... 382/100
(58) Field of Search .............................. 380/28, 54, 29, 380/30; 382/100, 232; 705/51

(56) References Cited

U.S. PATENT DOCUMENTS

| | | | | |
|---|---|---|---|---|
| 5,231,668 A | * | 7/1993 | Kravitz ........................ | 380/28 |
| 5,530,759 A | * | 6/1996 | Braudaway et al. .......... | 380/54 |
| 5,608,801 A | * | 3/1997 | Aiello et al. .................. | 380/46 |
| 5,613,004 A | * | 3/1997 | Cooperman et al. .......... | 380/28 |
| 5,651,069 A | * | 7/1997 | Rogaway ...................... | 380/28 |
| 5,664,016 A | * | 9/1997 | Preneel et al. ................ | 380/28 |
| 5,870,470 A | * | 2/1999 | Johnson et al. .............. | 380/285 |
| 5,915,027 A | * | 6/1999 | Cox et al. ..................... | 380/54 |
| 5,949,885 A | * | 9/1999 | Leighton ...................... | 380/54 |
| 5,995,625 A | * | 11/1999 | Sudia et al. ................... | 705/51 |
| 6,009,176 A | * | 12/1999 | Gennaro et al. .............. | 380/25 |
| 6,064,764 A | * | 5/2000 | Bhaskaran et al. .......... | 382/183 |
| 6,256,736 B1 | * | 7/2001 | Coppersmith et al. ...... | 713/176 |

OTHER PUBLICATIONS

Gary L. Friedman, et al., The Trustworthy Digital Camera: Restoring Credibility To The Photographic Image, Sep. 2, 1993, pp. 905–910, 1993 IEEE.

Ingemar J. Cox, et al., Secure Spread Spectrum Watermarking for Multimedia, 1995, ©NEC Research Institute, Tech. Report 95–10, pp. 1–33.

R.L. Rivest, The MD5 Message Digest Algorithm, Internet RFC 1321, Apr. 1992, pp. 1–21.

R.L. Rivest, et al., A Method For Obtaining Digital Signatures And Public–Key Cryptosystems, Feb. 1987, Communications of the ACM, vol. 21, pp. 120–126.

Minerva M. Yeung, et al., An Invisible Watermarking Technique For Image Verification, IBM T.J Watson Research Center, Yorktown Heights, NY 10598, unknown pub. date., 4 pp.

* cited by examiner

Primary Examiner—Andrew W. Johns
Assistant Examiner—Shervin Nakhjavan

(57) ABSTRACT

The present invention provides an invisible digital watermarking technique that can serve the two purposes of ownership verification and authentication, that can detect changes in pixel values as well as image size, and that may be used in public key or alternatively, secret key watermarking systems. The watermark insertion procedure computes a hash function and then combines the output of the hashed function of a modified image block, a key and various image parameters with a block of the watermark bitmap, resulting in a combined image block. As a final step to create a watermarked image block, the combined image block is inserted into the LSB of the modified image. The watermark extraction procedure takes the watermarked image block and creates two different image blocks: a first image,block with the LSB's of the watermarked image block set to zero, and a second image block with the LSB's of the watermarked image block extracted. The watermark extraction procedure uses the hash function to calculate a digest of values, resulting in a hashed output. The hashed output is combined with the second image block, preferably using an exclusive OR function. The result of the combined hashed output with the second image block is a block of the extracted watermark.

31 Claims, 15 Drawing Sheets

METHOD AND APPARATUS FOR DIGITAL WATERMARKING OF IMAGES

BACKGROUND OF THE INVENTION

Digital watermarking is a technique to insert a digital identifier into an image so that the identifier can be extracted for the purposes of ownership verification and/or authentication. By ownership verification, we mean that we can extract a digital identifier from a watermarked image that can be identified as being associated with an owner. Authentication refers to the fact that we can detect any change to the watermarked image. Digital watermarking is becoming increasingly important due to the popularity of the usage of digital images on the world wide web and in electronic commerce.

From the perspective of an image viewer, watermarks can be classified into two categories: visible and invisible. Visible watermarking refers to the class of watermarking procedures where a visible stamp, e.g., a company logo, is inserted into an image. The stamp is visible in similar fashion as the watermark to current U.S. dollar bills. U.S. Pat. No. 5,530,759, entitled "Color Correct Digital Watermarking of Images," to Braudaway et al. describes a method of inserting a visible watermark into an original digital image. Braudaway et al. teaches modifying the brightness or darkness of the original image based on the position of the watermark. The watermark insertion and extraction methodology described in Braudaway et al. includes a random noise component which increases the difficulty of removal of the watermark from the original image by anyone except the authorized user.

An invisible watermark is a digital identifier added to a digital image so that the resulting image is visibly indistinguishable from the original unmarked image. The invisible signature can be extracted or detected through a sequence of image processing operations on the digital image. The article "Secure Spread Spectrum Watermarking for Multimedia," Tech. Rep. 95-10, NEC Research Institute, 1995 by I. J. Cox, J. Kilian, T. Leighton, and T. Shamoon, describes a method of inserting an invisible watermark into a digital image. The Cox article describes transformation of an original image into a frequency domain representation of the image. From the frequency transformed representation of the image, the method described in Cox picks N frequency components of the image that are visually important and inserts a watermarking signal into these frequency components of the original image as a watermark.

One way to accomplish ownership verification is to associate a user key with a watermark so that the desired watermark can only be extracted from a watermarked image with the appropriate user key. Two conventional watermarking methodologies include: (1) secret key watermarking, that requires that both the owner and receiver possess the same secret key and (2) public key watermarking, that requires the use of two different keys: a private key, and a corresponding public key. The private key is known only to the owner. The public key need not be secret and is used by the receiver of the image to detect the watermark. A problem with secret key watermarking is that key exchange must occur before the actual transmission, typically via a more expensive secret alternative path, or must be arranged when sender and receiver are proximate.

In the article "An invisible watermarking technique for image verification,", M. M. Yeung and F. Mintzer, Proceedings of ICIP (Santa Barbara, Calif.), October 1997, an authentication watermarking method is described for a secret key system. In the method described in the Yeung article, a secret key is used in combination with a random number generator to generate a look up table. The look up table defines a watermark extraction procedure, which in turn suggests a watermark insertion step through adjustments to the original image. In the watermark extraction step, the extracted watermark is compared to a known watermark to determine if the original image has been modified. Although, the technique described by Yeung can detect changes to the pixel values of a watermarked image, it does not detect changes in image size resulting from cropping or certain scaling algorithms.

A method of invisible watermarking that can be used both for purposes of ownership verification and authentication, that can detect changes in pixel values as well as image size, and that may be used in public key or alternatively, secret key watermarking systems is needed.

SUMMARY OF THE INVENTION

The present invention provides an invisible digital watermarking technique that can serve the two purposes of ownership verification and authentication, that can detect changes in pixel values as well as image size, and that may be used in public key or alternatively, secret key watermarking systems. The present invention includes a watermark insertion procedure used by the image owner and a corresponding extraction procedure used by the receiver of the image. The watermark insertion procedure computes a hash function of a modified image block, a key and various image parameters, and then combines the hashed output with a block of the watermark bitmap, resulting in a combined image block. In the preferred embodiment, the modified image block is the original image block with its LSB's set to zero. As a final step to create a watermarked image block, the combined image block is inserted into a LSB of the modified image.

The watermark extraction procedure takes the watermarked image block and creates two different image blocks: a first image block with the LSB's of the watermarked image block set to zero, and a second image block with the LSB's of the watermarked image block extracted. The first image block, a key and various image parameters are used as inputs to the hash function. Although the inputs to the hash function for the watermark extraction process are different than the inputs to the hash function for the watermark insertion process, the cryptographic hash functions used for both watermark insertion and extraction must be identical. If the hash functions are different, the watermark will not be able to be properly extracted and the extracted watermark image will appear as noise.

The watermark extraction procedure uses the hash function to calculate a digest of values, resulting in a hashed output. The hashed output is combined with the second image block, preferably using an exclusive OR function. The result of the combined hashed output with the second image block is a block of the extracted watermark.

The previously described insertion and extraction methodology may be used for secret key encryption where the same secret key is used for both watermark insertion and extraction. In an alternative embodiment, the methodology described is modified so that the integrity and ownership of the image can be verified using a public key. In this alternative embodiment, a public key encryption step is included after the step combining of the hashed function with the watermark bitmap for the watermark insertion procedure. In addition, for the watermark extraction procedure, a public key decryption step is included before the extraction of the watermark using the reversible exclusive OR logic function. In such a system, the owner of the image inserts a watermark using a private key K'. In the watermark extraction procedure, any person can use the public key K (corresponding to the private key K') to extract a binary watermark, that will indicate any changes that have been made to the watermarked image.

The present invention provides authentication that detects any change to the watermarked image for both a secret key and public key watermarking system. Detection of change is important for example where an image is to be used as evidence for legal purposes and in electronic commerce of images, where the buyer of an image can be assured that no change to the image has occurred when the image is delivered from the seller to the buyer. If any part of the image is changed, the watermark extraction procedure, according to the present invention, will return an output that indicates the specific parts of the image that have been changed. If a watermarked image is cropped, then the extraction procedure will also return an output that resembles random noise, signifying the cropped image is not valid.

A further understanding of the nature and advantages of the present invention may be realized with reference to the remaining portions of the specification and the attached drawings.

DETAILED DESCRIPTION OF THE PREFERRED EMBODIMENTS

Figure 1A:
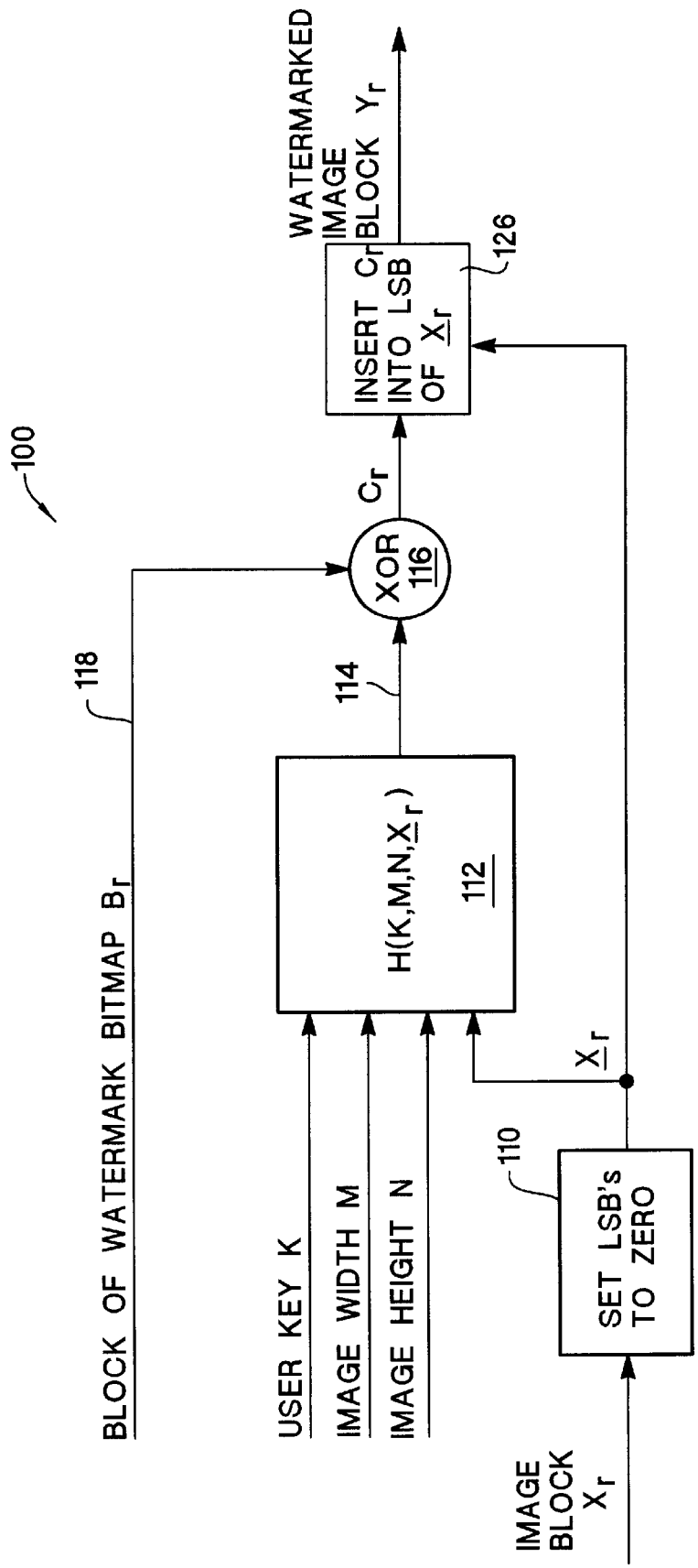
FIG. 1A shows a block diagram of the watermark insertion methodology according to a first embodiment of the present invention.
Figure 1B:
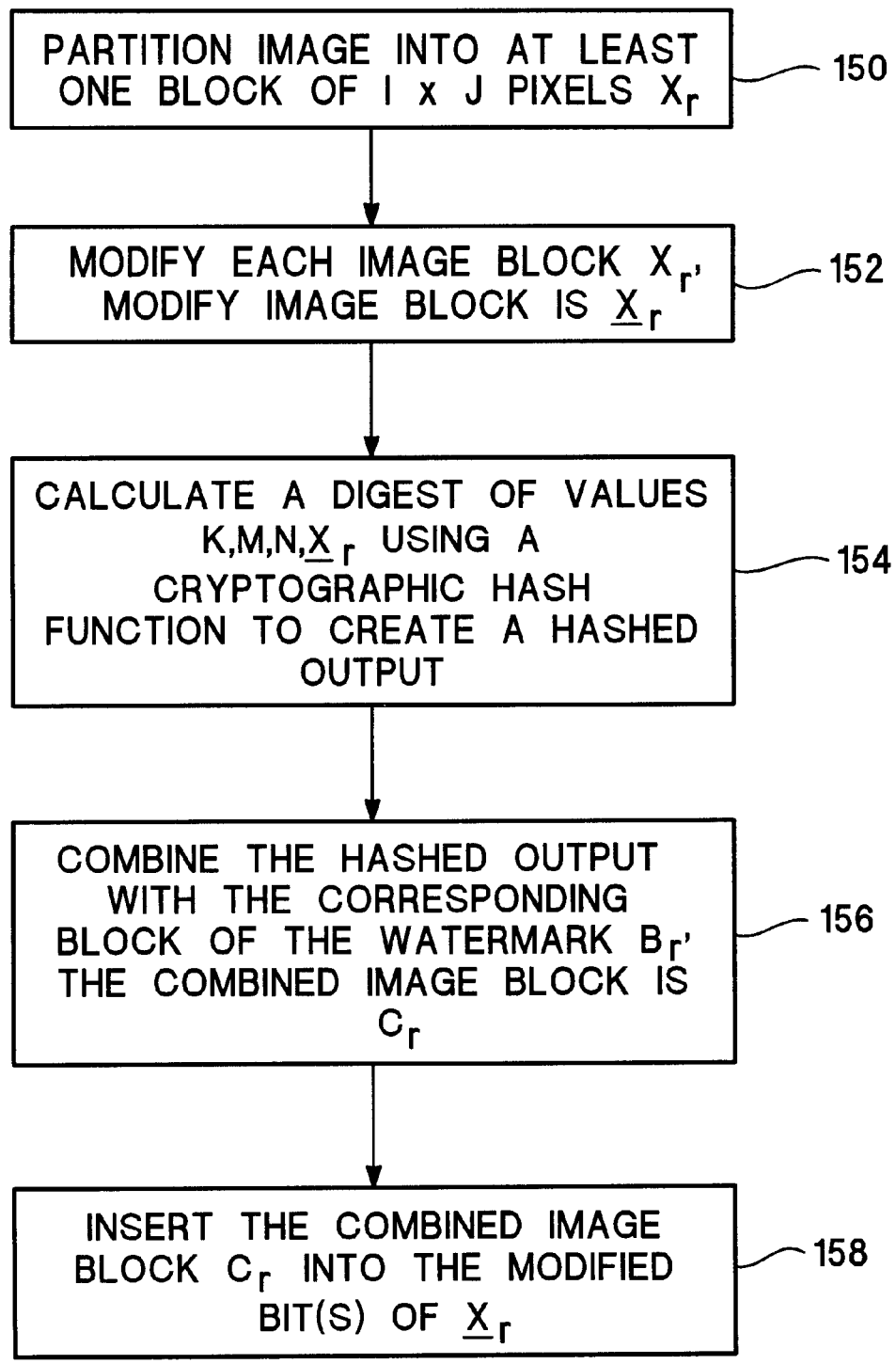
FIG. 1B shows a flowchart of the steps corresponding to the insertion methodology shown in FIG. 1A.
Figure 2A:
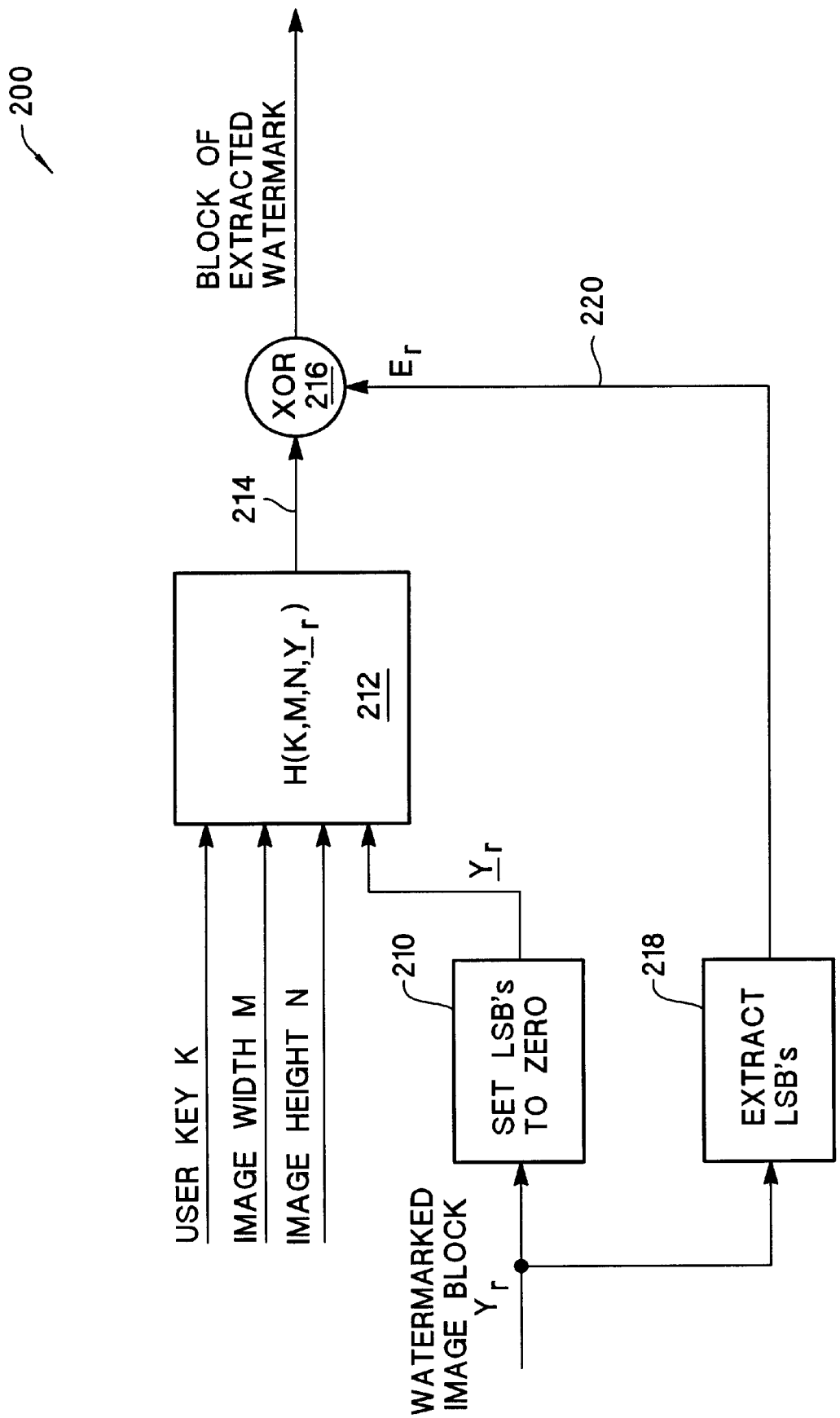
FIG. 2A shows a block diagram of the watermark extraction methodology that is used in combination with the insertion methodology shown in FIGS. 1A, 1B, and 1C.
Figure 2B:
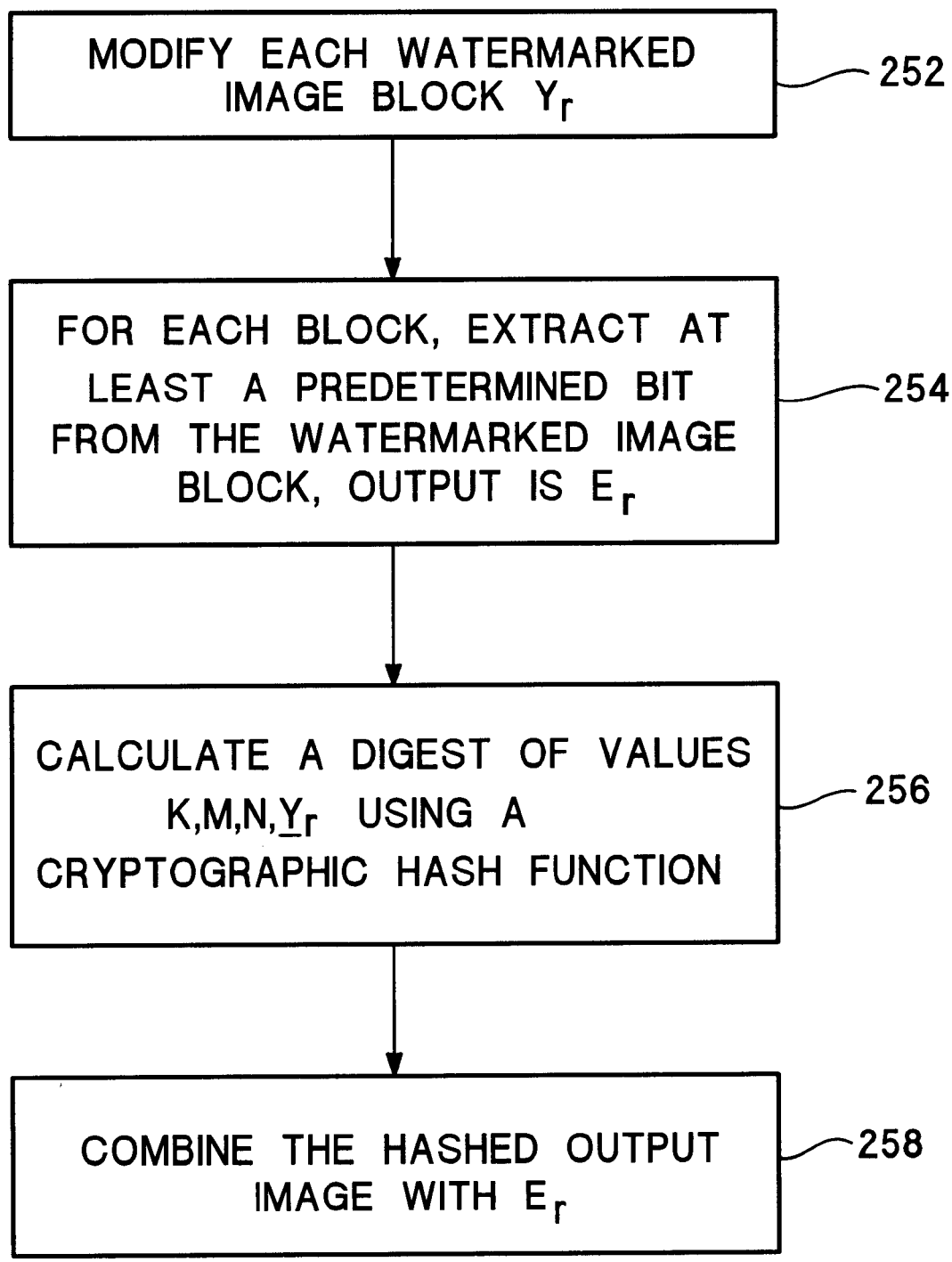
FIG. 2B shows a flowchart of the watermark extraction procedure that is used in combination with the insertion methodology shown in FIGS. 1A, 1B, and 1C.

The present invention provides a technique for embedding and extracting a digital identifier into an image $X_{m,n}$ of M×N pixels, to form a watermarked image $Y_{m,n}$ of the same size. FIGS. 1A and 1B show a watermark insertion methodology according to a first embodiment of the invention. FIGS. 2A and 2B show a watermark extraction methodology according to a first embodiment of the invention. The watermark extraction methodology shown in FIGS. 2A and 2B should be used in conjunction with the watermark insertion methodologies shown in FIGS. 1A and 1B.

Referring to the block diagram in FIG. 1A, shows a block diagram for implementing the watermark insertion procedure. FIG. 1B shows a flowchart of the steps corresponding to the insertion methodology shown in FIG. 1A. Referring to FIG. 1A, an apparatus 100 for implementing the insertion of a watermark into an original input digital image according to the present invention would include: a means for modifying 110 at least one predetermined bit in an image block $X_r$, wherein the modified image block is $\underline{X}_r$; a means for calculating a digest of values 112 using a cryptographic hash function, wherein the means for calculating a digest of value outputs a hashed output 114, wherein the means for modifying 110 at least one predetermined bit of the image block is electrically coupled to the means for calculating a digest of values 112; a means for combining 116 the hashed output 114 with a watermark 118, wherein the means for combining 116 the hashed output 114 with a watermark 118 is electrically coupled to the means for calculating a digest of values 112, wherein the output of the means for combining is a combined image block; and a means for inserting 126 the combined image block ($C_r$) into the modified image block $\underline{X}_r$, wherein the means for inserting 126 the combined image block ($C_r$) into the modified image block $\underline{X}_r$ is electrically coupled to the means for modifying 110 at least one predetermined bit of the image block.

Referring to the flowchart of FIG. 1B, in the preferred embodiment the method for inserting a watermark into a digital original input image including the steps of: partitioning the image block $X_r$ into at least one I×J block (step 150); for each I×J block, modifying at least a predetermined bit of the block to a predetermined value (step 152), wherein the modified image block is $\underline{X}_r$; calculating a digest of the values using a cryptographic hash function (step 154); combining the hashed output calculated in the previous step with a watermark bitmap $B_r$ (step 156), wherein the output of the step of combining the hashed output with a watermark $B_r$ is an combined image block $C_r$; and inserting the value $C_r$ into the modified image $\underline{X}_r$ (step 158).

The steps shown in FIG. 1B correspond to the implementation blocks shown in FIG. 1A. For example, the step of calculating a digest of values (step 154) corresponds to the implementation block 112 in FIG. 1A. In other words, the step of calculating a digest of values is performed by block 112. Similarly, step 152 corresponds to block 110, step 156 corresponds to block 116 and step 158 corresponds to block 126. Although FIG. 1B shows a flowchart of the steps in FIG. 1A, the block diagram shown in FIG. 1A clearly shows the inputs and outputs resulting from each step and the sequence of steps.

The input to the means for setting a predetermined bit to a predetermined value is a block of the original input image $X_{m,n}$. In the preferred embodiment the original input image $X_{m,n}$ is a gray scale image of size M×N. In an alternative embodiment, the original input image is color image. In the case of a color image, the same technique shown in FIGS. 1A, 1B, 1C, 2A, 2B, 9A, 9B, 10A, and 10B can be applied independently to the color planes of the image, either in the RGB color space or in any other color space such as for example, YUV.

In the preferred embodiment the image $X_{m,n}$ is partitioned into blocks of I×J pixels. In one embodiment, the partitioned blocks in this application the blocks described are 8×8, although other block sizes are possible. Further, the step of partitioning the original image into I×J pixel blocks may be eliminated (this is equivalent to partitioning the image into one block, the image block having a block size where I=M and J=N). However, having one block for the entire image is not desirable. Partitioning the original input image helps maintain localization when authenticating an image. Further, partitioning helps the viewer of the image more clearly see the location where changes in the image have occurred.

Let $a_{m,n}$ be a bi-level image that represents the watermark to be embedded in $X_{m,n}$. Note that $a_{m,n}$ need not be of the same size as $X_{m,n}$. From $a_{m,n}$, we can form another bi-level image $b_{m,n}$ of size M×N (same size as $X_{m,n}$). There are many ways of transforming the image $a_{m,n}$ into an image the same size as $X_{m,n}$. For example, $b_{m,n}$ may be formed by tiling $a_{m,n}$, i.e., periodically replicating $a_{m,n}$ to the desired size. Another possibility is to append all zeros (or all ones) to the boundary of $a_{m,n}$ so that we obtain $b_{m,n}$ of the desired size.

For an original input image $X_{m,n}$ partitioned into I×J pixel blocks, let $$X_r = \{x_{iI+kjJ+1} : 0 \leq k \leq I-1; 0 \leq l \leq J-1\}$$

be a block of size I×J taken from the image $X_{m,n}$. For simplicity, we are using a single index r to denote the $r^{th}$ block in the image. The corresponding block within the binary image $b_{m,n}$ for the watermark bitmap 118 is denoted $$B_r = \{b_{iI+kjJ+1} : 0 \leq k \leq I-1; 0 \leq l \leq J-1\}.$$

Note that I and J can be any number provided they satisfy IJ≤p, where p is the size of the hash function 112.

The input to the means for modifying 110 at least one predetermined bit of a image block to a predetermined value is a rth block of the image $X_{m,n}$. In the preferred embodiment, the bit being set is the LSB of the block. Modifying the LSB of the block causes the least visible image distortion, an important factor for an invisible watermark. Although the embodiment shown in FIG. 1A is preferred, other alternative methodologies for modifying the image block $X_r$ available. However, even if alternative methodologies are implemented, it is critical that the identical methodology for modifying the image block $X_r$ (means 110, step 152a) in the watermark insertion process must also be used for modifying the watermarked image block $Y_r$ (means 210, step 252a) for the watermark extraction process shown in FIGS. 2A and 2B.

In the embodiment shown in FIG. 1A, the image block $X_r$ is modified by setting the LSB of the image block to zero. In an alternative embodiment of the embodiment implemented in step 152, a bit other than the LSB (or alternatively a group of bits) may be set to a predetermined value. In the embodiment shown in FIG. 1A, the predetermined value is zero, although the value determined by the system designer may be changed. As previously described, although the value of the predetermined value and the bit location of the predetermined bit may be changed by the system designer, it is critical that the same predetermined bit and predetermined value used in the watermark insertion procedure defined in FIG. 1A should also be used in the watermark extraction procedure defined in FIGS. 2A and 2B. In other words, if the means for setting a predetermined bit 110 of the block of the original input image to a predetermined value uses the LSB of the image as its predetermined bit and the value zero as its predetermined value, then the means for setting a predetermined bit 210 in FIG. 2A should use the LSB of the image as its predetermined bit and the value zero as its predetermined value.

Figure 1C:
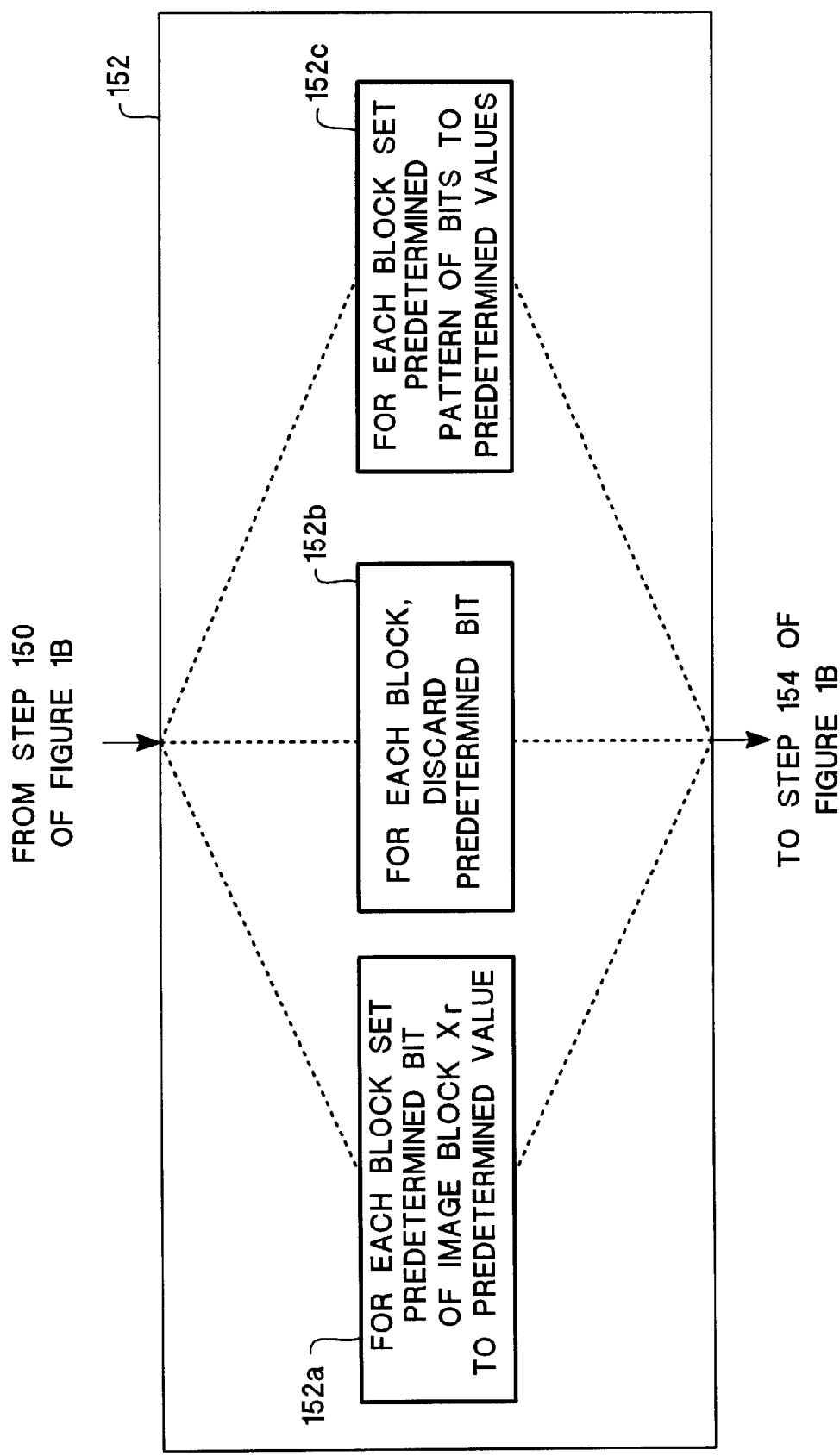
FIG. 1C shows alternatives to step 152 of FIG. 1B ( modifying the image block $X_r$. )

FIG. 1C shows various alternatives for modifying the image block $X_r$. In a first embodiment (as shown in FIG. 1A), for each block, a predetermined bit of the image block $X_r$ is set to a predetermined value. However, in an alternative embodiment, for each block a predetermined bit(s) would be discarded (step 152b). If a predetermined bit(s) is discarded, it is this predetermined bit(s) that the combined image block $C_r$ is preferably inserted in. In a third alternative embodiment, the image block could be modified according to a pattern of bits (step 152c). If a predetermined block is modified according to a pattern, it is this pattern of bit(s) that the combined image block $C_r$ is preferably inserted in (step 158). FIG. 1C shows only three possible alternatives for modifying the image block $X_r$. Other alternatives for modifying the image block $X_r$ are possible. What is critical is that the image block $X_r$ be modified. Preferably, at least a portion of the combined image is inserted into the modified bits of the modified image block $\underline{X}_r$.

The output of the means for modifying a predetermined bit of the block of the image block is $\underline{X}_r$. $\underline{X}_r$ is input to both the means for calculating a digest of values K, M, N, $\underline{X}_r$ using a cryptographic hash function and a means for inserting $C_r$ into a predetermined bit of $\underline{X}_r$. Referring to FIGS. 1A and 1B, the inputs to the means for calculating a digest of values using a cryptographic hash function are K (user key), $\underline{X}_r$ (modified image block), M (the width of the original input), and N (the height of the original input block).

Referring to FIGS. 1A and 1B show the step of calculating a digest of the values K, M, N, $\underline{X}_r$ using a cryptographic hash function. The cryptographic hash function may be chosen from a variety of hash functions. In the preferred embodiment, the well known MD5 function or a variant thereof is used. The MD5 function is described, for example, in the article "The MD5 Message Digest Algorithm," R. L. Rivest, Internet RFC 1321, April 1992. For the rest of this disclosure, we will use MD5 as our hash function although in alternative embodiments, other cryptographic has functions may also be used.

In the embodiment described by the present invention, K is the secret encryption key, $\underline{X}_r$ is the modified original input image block, M is the width of the original input image, and N is the height of the original input image. Consider a cryptographic hash function $$H(S)=(d_1, d_2, d_p)$$

where S represents a string of data of arbitrary length, $d_i$'s are the binary output bits of the hash function, and p is the size of the output bit string. It has the property that given an input bit string S and its corresponding output $(d_1, \ldots, d_p)$, it is computationally infeasible to find another input bit string of any length that will be hashed to the same output $(d_1, \ldots, d_p)$. Using the MD5 hash algorithm, any data string may be hashed into a bit array of length 128, i.e., p=128. If another cryptographic function is used, the length p may be different. In the preferred embodiment, the inequality $p \geq IJ$ is satisfied.

Let K be a user key consisting of a string of bits. In the preferred embodiment, for each block of data $X_r$ we form the corresponding block $\underline{X}_r$ where each element in $\underline{X}_r$ equals the corresponding element in $X_r$ except that the least significant bit is set to zero. We compute for each block the hash $$H(K, MN, \underline{X}_r)=(d'_1, d'_2, \ldots, d'_p).$$

Then, we select the first IJ bits in the hashed output and form the rectangular array $d_{m,n}$ of size I×J.

The hashed output d $(d'_1, d'_2, \ldots, d'_p)$ and a block of the watermarked bitmap $B_r$ are inputs into the means for combining the hashed output with a watermark. The process for extracting and inserting a watermark both include the step of combining the hashed output with the watermark $B_r$. The step of combining the hashed output 114 with the watermark 118 is performed using a bitwise logical operation. This allows easy processing for both the watermark insertion and extraction processes. In the preferred embodiment, and as shown in FIGS. 1A and 1B, the bitwise logical operation is an exclusive or function.

Referring to FIG. 1A, the hashed output array is combined with $B_r$ to form a new binary block $C_T$ using a pixel by pixel exclusive OR operation. That is, we form $$c_{m,n}=b_{m,n} \oplus d_i,$$

where $\oplus$ is the exclusive OR operation, and $c_{m,n}$ are the elements in $C_r$, $b_{m,n}$ are the elements in $B_r$ and $d_i$ are the elements of the hashed output d.

In the preferred embodiment, the final step before the creation of the watermarked image is inserting the value $C_r$ into the modified image $\underline{X}_r$. In the modified image block $\underline{X}_r$, at least one bit of the image block is set to a predetermined value. Typically, $C_r$ is only inserted in bits that have been modified. Although preferably, each bit that has been modified corresponds to an insertion bit of $C_r$, in an alternative embodiment, a bit $C_r$ does not correspond to each modified bit of the image block and therefore a value of $C_r$ is not inserted into every modified bit. In the preferred embodiment, where the LSB's of the image block are modified to be set to zero, and $C_r$ is inserted into the LSB of $X_r$, a value of $C_r$ is inserted into each modified bit.

In the preferred embodiment, we put $c_{m,n}$ into the least significant bit of the block $\underline{X}_r$ to form the output block $Y_r$. This procedure is repeated for each block of data, and all the output blocks $Y_r$ are assembled together to form the watermarked image $Y_{m,n}$. The combined output block $C_r$ and the modified image $\underline{X}_r$ are inputs into a means for inserting $C_r$ into a predetermined bit of $\underline{X}_r$. The output of the means for inserting $C_r$ into a predetermined bit of $X_r$ is the output image block $Y_r$. The output image block $Y_r$ is a watermarked image block.

Referring to FIG. 2A shows a block diagram 200 of the watermark extraction methodology that may be used in combination with the insertion methodology shown in FIGS. 1A and 11B. The watermark extraction process extracts the watermark $B_r$ from the image block $Y_r$ to retrieve the watermark. Referring to FIG. 2A, the watermark extraction apparatus includes a means for modifying at least a predetermined bit to a predetermined value 210; a means for extracting a predetermined bit from the watermarked image block $Y_r$; a means for calculating a digest of values using a cryptographic hash function, wherein the means for modifying a predetermined bit 210 is electrically coupled to the means for calculating a digest of values 212; and a means for combining 216 the hashed output value 214 with the extracted image block $E_r$, wherein the means for combining 216 the hashed output value 214 with the extracted image block $E_r$ 220 is electrically coupled to the means for extracting 218 a predetermined bit from the watermarked image block $Y_r$.

Referring to FIG. 2A and the flowchart shown in 2B shows a method of extracting a watermark from a digital image $Y_r$, including the steps of: for each I×J block, modifying at least a predetermined bit of the watermarked image $Y_r$ to a predetermined value (step 252), wherein the modified watermarked image $Y_r$ is $\underline{Y}_r$; extracting at least a predetermined bit from the watermarked image (step 254); calculating a digest of the values using a cryptographic hash function (step 256); combining the hashed output with the image block $E_r$.

Referring to FIG. 2A, the inputs to the block for calculating a digest of the values K, M, N, $\underline{Y}_r$ using a cryptographic hash function are K (the user key), M (the image width of the original image), and N (the image height of the original image) and $\underline{Y}_r$ (the watermarked image block modified to set a predetermined bit of an image block to a predetermined value). Thus, the step of modifying a predetermined bit (step 252) of the watermarked image block to a predetermined value, must be performed before the step of calculating a digest of the values (step 256) K, M, N, $\underline{Y}_r$ using a cryptographic hash function.

After we have obtained the extracted watermark, the extracted watermark can be compared (visually, via a computer image comparison program, etc.) to an appropriate watermark. For example, the appropriate watermark may be an image transmitted to the receiver at an earlier time for watermark comparison purposes. If there is deviation between the two watermarks, then the locations of the deviations indicate the regions within the watermarked image that have been changed.

Figure 3:
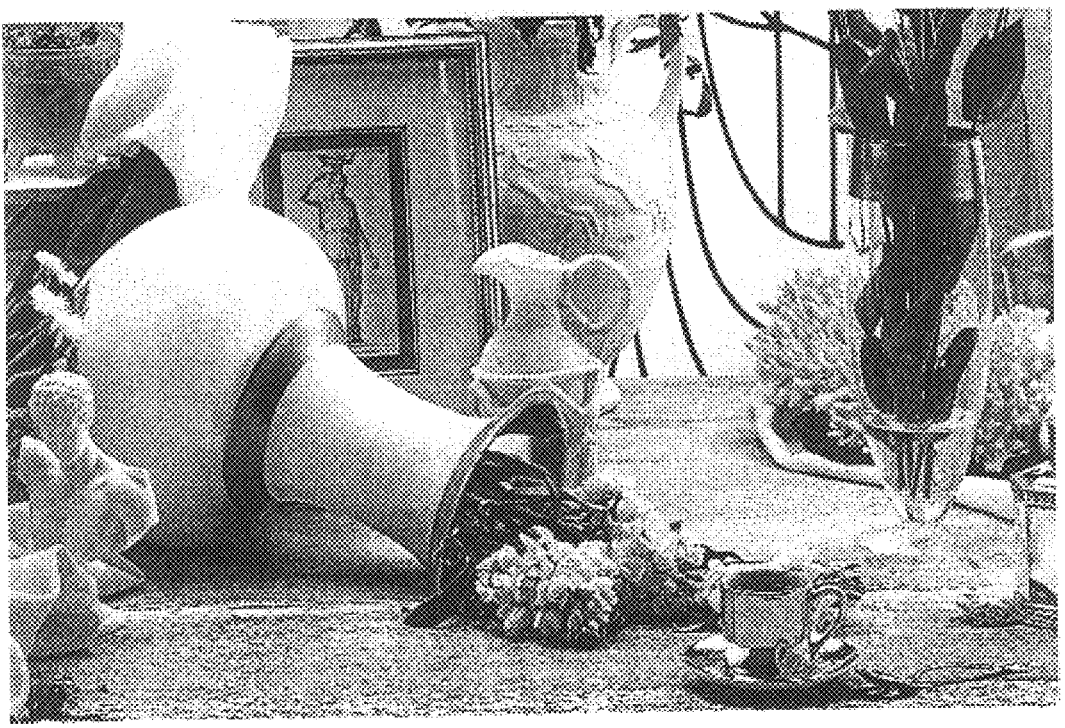
FIG. 3 shows an original image before watermark insertion.
Figure 4:
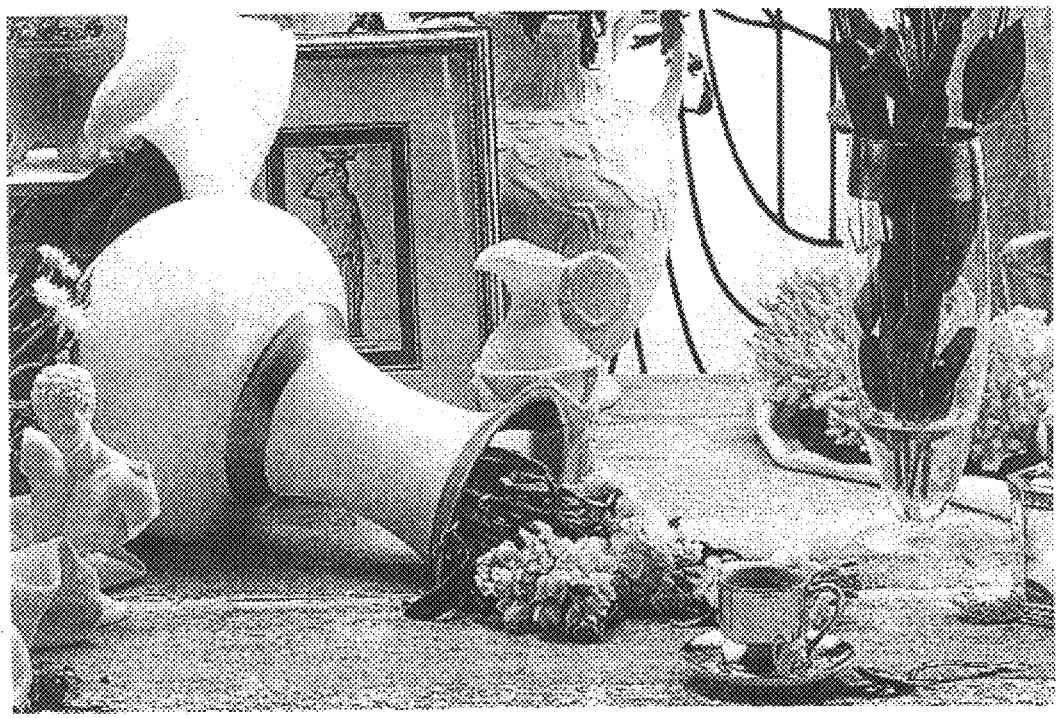
FIG. 4 shows an image watermarked using the watermark insertion methodologies described in FIGS. 1A and 1B.

FIGS. 3–8 more clearly shows the properties exhibited by images created using the watermarking methodology according to FIGS. 1A, 1B, 2A and 2B. For example, FIGS. 3 and 4 clarify that the watermarking method described by the present invention implements an invisible watermark. Referring to FIG. 3 shows an original image before the watermark insertion. FIG. 4 shows a watermarked image that has been watermarked using the watermark insertion methodologies described in FIGS. 1A and 1B. Comparing the FIGS. 4 and 3, it can be seen that the watermark produced is an invisible watermark since there is no visually observable difference between the two images.

Figure 5:
FIG. 5 shows the extracted watermark output image after application of the watermark extraction procedure of FIGS. 2A and 2B when a correct user key K is used.
Figure 6:
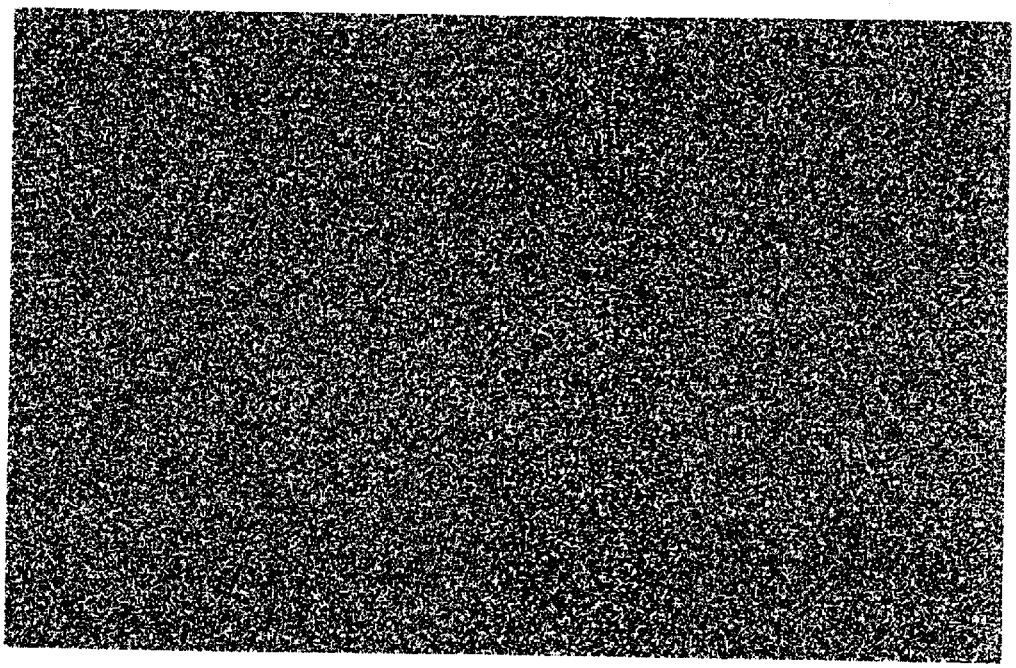
FIG. 6 shows an extracted watermark output image resembling random noise that may occur for example, if an image is unmarked, an incorrect key is applied, or the original image is cropped.

Another property clearly exhibited by FIGS. 5 and 6 is that a correct user key is required for the extraction of a proper watermark. If one uses the correct user key K and applies the watermark extraction procedure to FIG. 4, one obtains an output image FIG. 5, indicating the presence of a proper watermark. In contrast, FIG. 6 shows an output image resembling random noise that may occur for example, if an image is unmarked, an incorrect key is applied, or the original image is cropped. If an image is unmarked, i.e., if it does not contain a watermark, the watermark extraction procedure returns an output that resembles random noise as shown in FIG. 6. Similarly, if one applies an incorrect key (for example, if one does not know the key), then the watermark extraction procedure returns an output that resembles random noise. As another example, if a watermarked image is cropped and then one applies the watermark extraction procedure on this cropped image, the output would resemble random noise.

Figure 7:
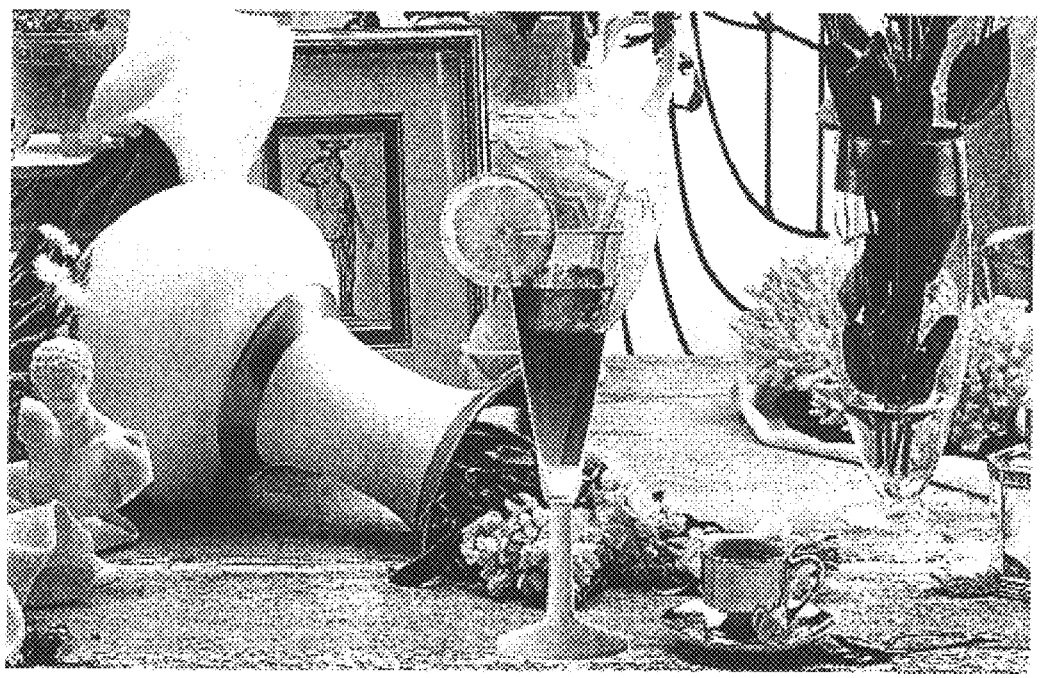
FIG. 7 shows the watermarked image of FIG. 4 that has been modified by the inclusion of a glass.
Figure 8:
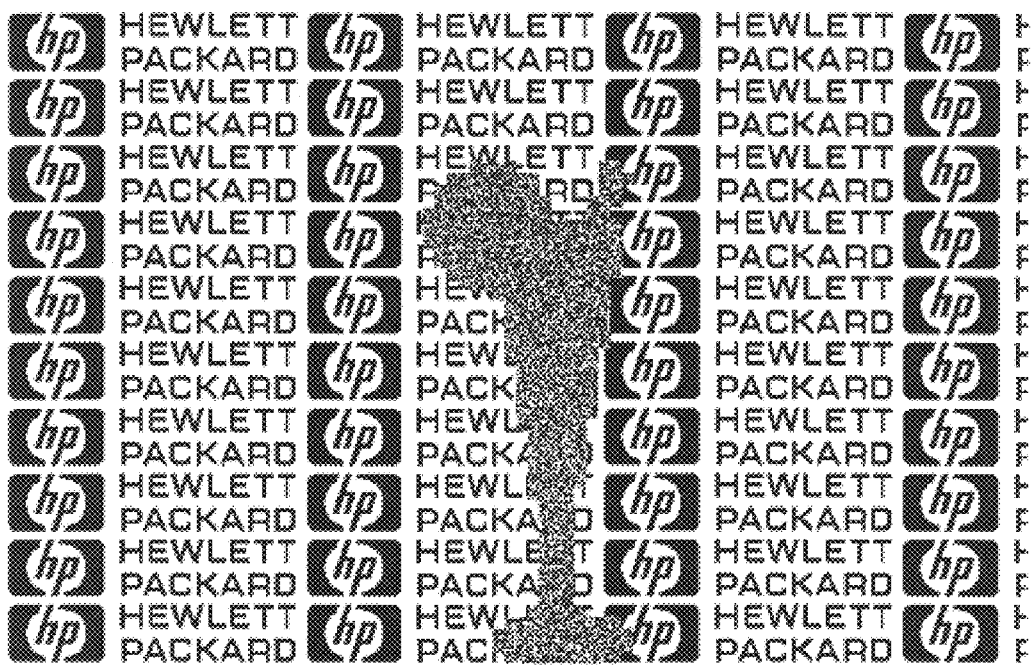
FIG. 8 shows the extracted watermark from FIG. 7 indicating the specific area where the modification to the watermarked image (the addition of a glass) have been made.

FIG. 7 shows the watermarked image of FIG. 4 that has been modified by the inclusion of a glass. FIG. 8 shows the extracted watermark from FIG. 7 indicating the specific area where the modification to the watermarked image (the addition of a glass) have been made. If one changes certain pixels in the watermarked image, then the specific locations of the changes are reflected at the output of the watermark extraction procedure. FIG. 7 shows an image where a glass is pasted onto FIG. 4. FIG. 8 shows the extracted watermark from FIG. 7, indicating the specific area where changes have been made.

A question that arises is that whether the watermark is secure if it is put into the least significant bit of the image. Recall that this watermark is designed for authentication purposes, i.e., to detect any change to the image. If someone attempts to remove the watermark by changing some bit planes of the image, the watermark extraction procedure will detect the changes.

A very important issue is whether it is possible for someone to forge a watermark into the scheme. Consider an image block $B_r$. Suppose someone wants to alter some or all of the pixels in this image block so that it becomes $\underline{B}_r$. It is necessary that the pixel values in the two image blocks satisfy $$H(K, M, N, B_r) = H(K, M, N, \underline{B}_r \text{hd } r).$$

That is, the digest generated from both image blocks must be identical. This is considered computationally infeasible because of the properties of cryptographic hash functions such as the MD5 algorithm.

In the first embodiment (described and shown in FIGS. 1A, 1B, 1C, 2A, 2B and the accompanying text), watermark insertion and extraction is described for a secret key system. A second embodiment (described and shown in FIGS. 9A, 9B, 10A, 10B and the accompanying text in the specification) provides watermark insertion and extraction for a public key system.

Figure 9A:
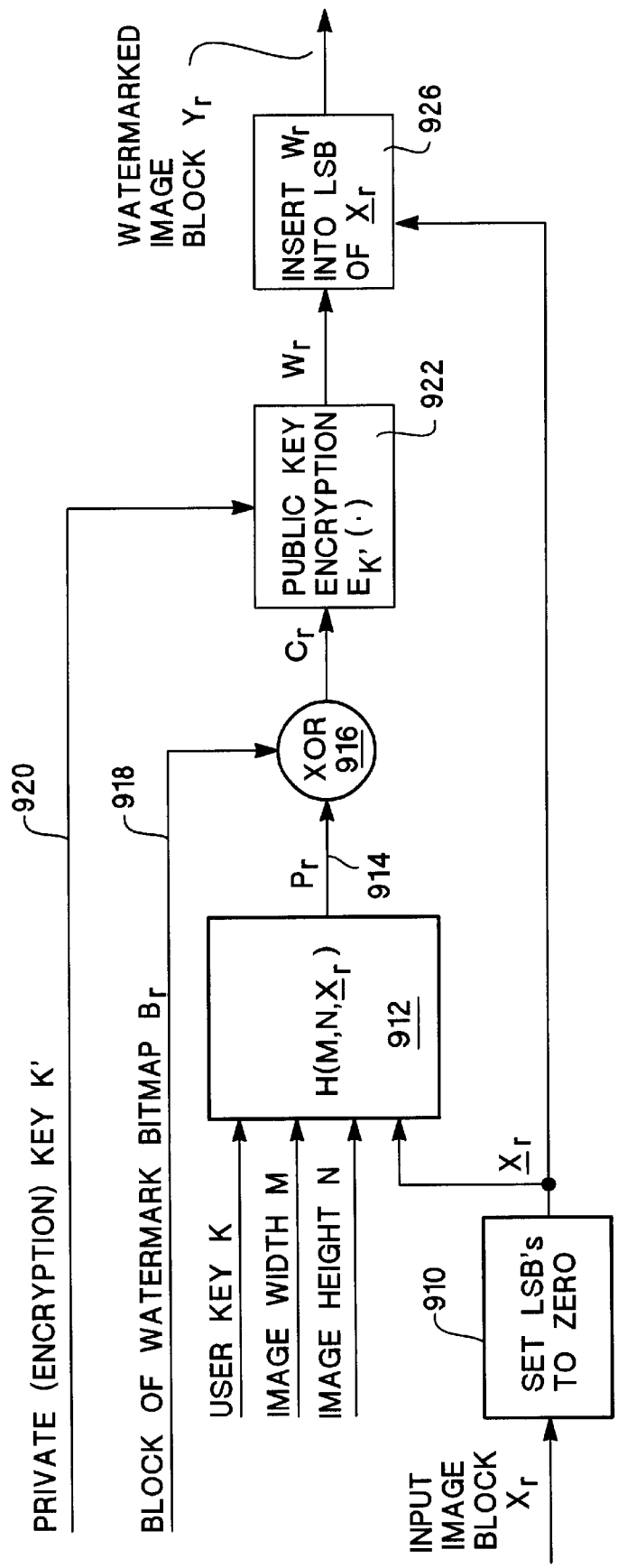
FIG. 9A shows a block diagram of the watermark insertion methodology according to a second embodiment that implements a public key system.
Figure 10A:
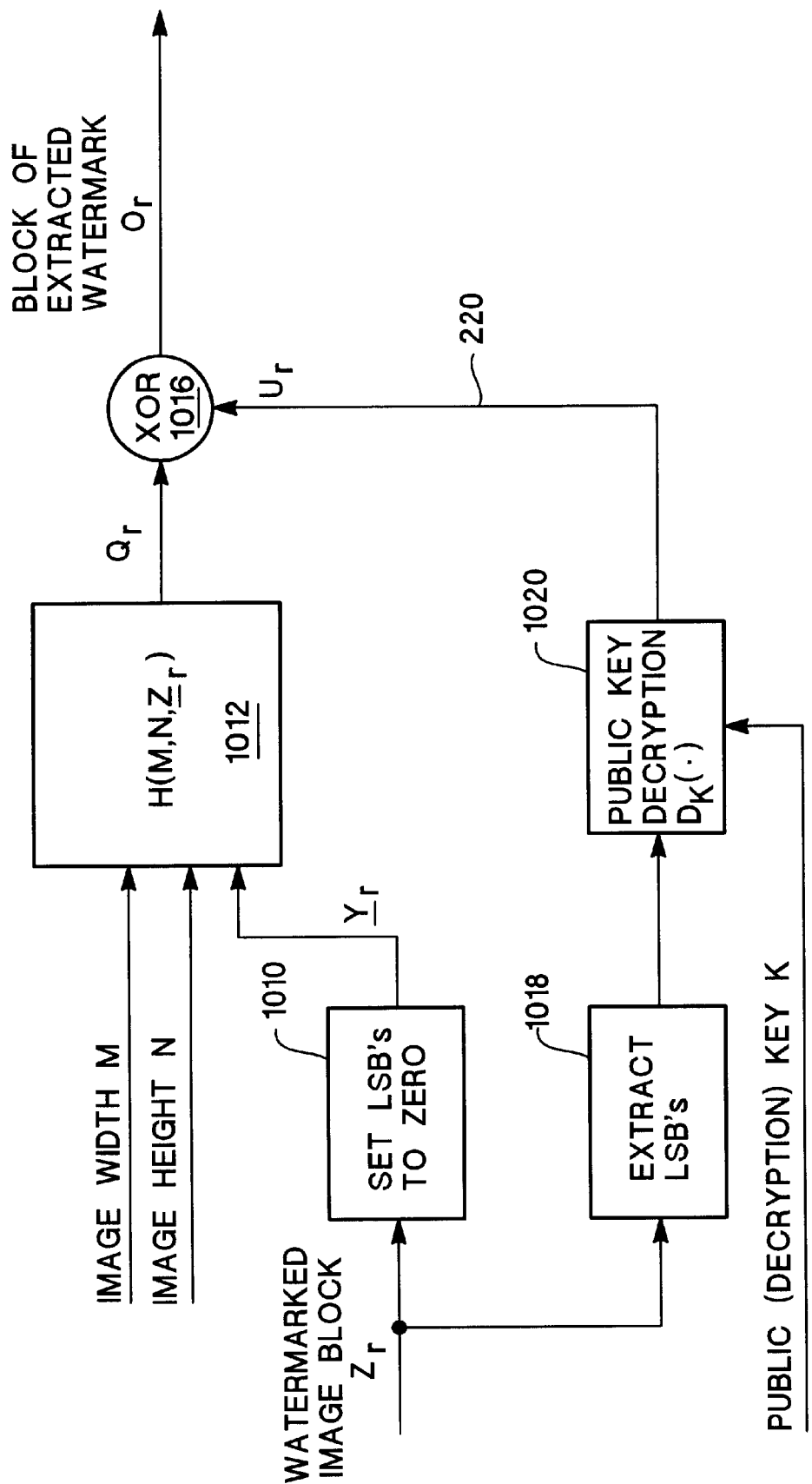
FIG. 10A shows a block diagram of the watermark extraction methodology that is used in combination with the insertion methodology shown in FIGS. 9A and 9B.

FIG. 9A shows a block diagram of an electronic system for implementing the insertion of a watermark into an original input digital image for a public key system. The block diagram shown in FIG. 9A is a modified version of the system shown in FIG. 1A, where the modifications have been made to include public key encryption. Similarly, the block diagram shown in FIG. 10A is a modified version of the system shown in FIG. 2A except that the extraction methodology shown in FIG. 10A has been modified to include public key decryption.

Figure 9B:
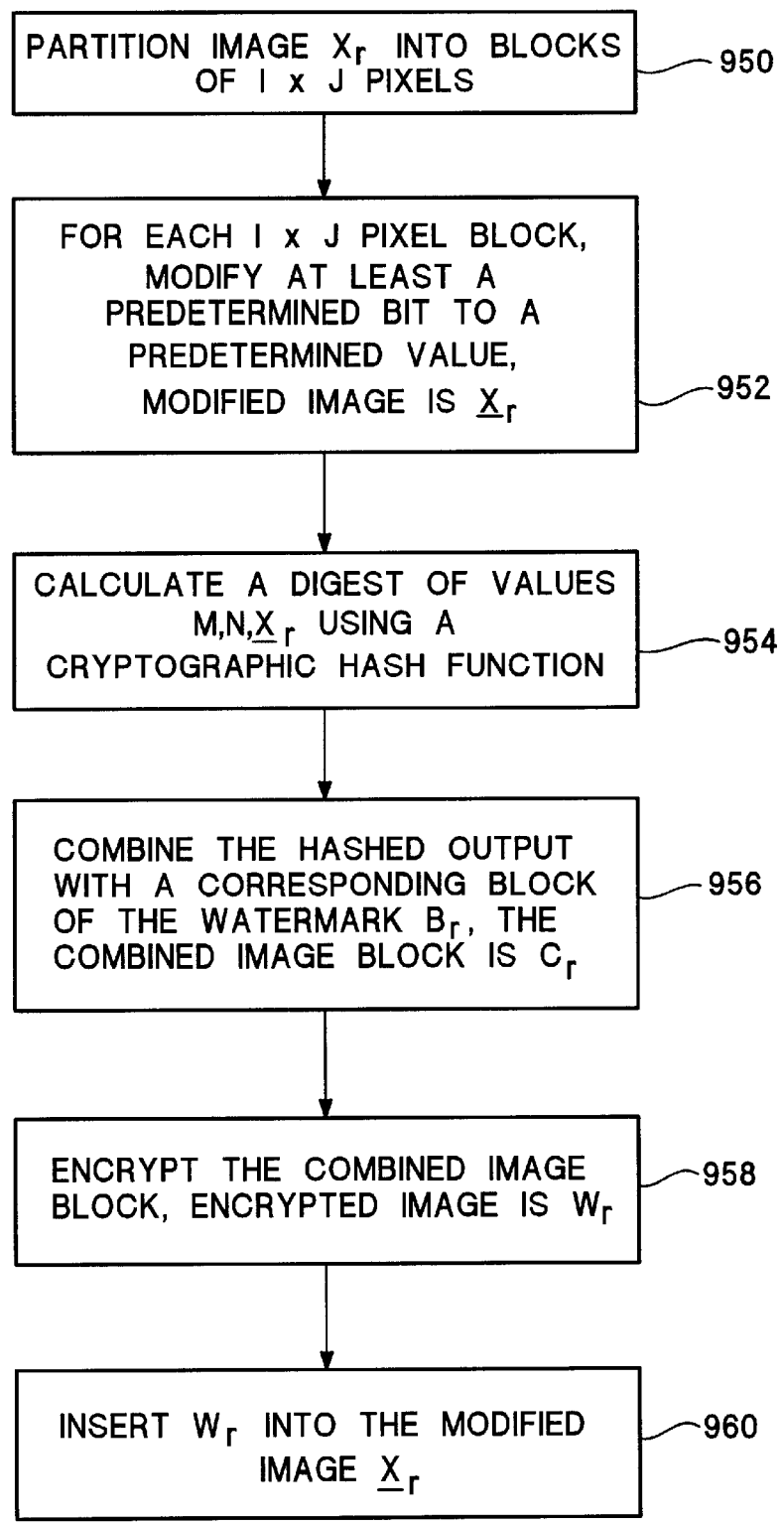
FIG. 9B shows a flowchart of the steps corresponding to the insertion methodology shown in FIG. 9A.

Except for the modifications made for the purposes of including public key encryption (for example, the inputs to the hash function and electrical connections have been modified), in general the statements made with respect to FIGS. 1A, 1B, 1C can also be made with respect to FIGS. 9A and 9B. Similarly statements made with respect to FIGS. 2A and 2B apply with respect to FIGS. 10A and 10B. For example, the statement made with respect to FIG. 1A, that the image block $X_r$ may be modified according to the alternatives shown in FIG. 1C, is also true for FIG. 9A (the implementation block 910 may be modified according to the alternatives shown in FIG. 1.).

FIG. 9A shows a block diagram of the watermark insertion methodology according to a second embodiment that implements a public key system. FIG. 9B shows a flowchart of the steps corresponding to the insertion methodology shown in FIG. 9A. Similar to the image defined in the first embodiment, for the public key system we assume a grayscale image $X_{m,n}$ having a size of M by N pixels. We want to insert a binary invisible watermark image been to $b_{m,n}$ to $x_{m,n}$ obtain the watermarked image $Y_{m,n}$. Similar to the first embodiment, watermark insertion and extraction is performed on blocks of image data. For convenience, we chose the image block size to be 8 by 8.

Referring to FIG. 9A, the apparatus for insertion of watermark for a public key system includes: a means for modifying at least a predetermined bit of the image block $X_r$ 910; a means for calculating a digest of values using a cryptographic hash function 912, wherein the means for calculating a digest of value outputs a hashed output $P_r$ 914, wherein the means for modifying 910 at least a predetermined bit of the image block is electrically coupled to the means for calculating a digest of values 912; a means for combining 916 the hashed output with a watermark, wherein the means for combining 916 the hashed output with a watermark is electrically coupled to the means for calculating a digest of values 912; a public key encryption means 922 electrically coupled to the means for combining 916 the hashed output and watermark; and a means for inserting 926 the encrypted output and watermark ($W_r$) into the predetermined bit of the block of the image $\underline{X}_r$, wherein the means for inserting $W_r$ is electrically coupled to the means for modifying 910 at least a predetermined bit the image block.

FIG. 9B shows a flowchart of the steps corresponding to the insertion methodology shown in FIG. 9A. Referring to the flowchart of FIG. 9B, the method for inserting a watermark into a digital original input image for a public key system includes the steps of: partitioning the original image $X_r$ into I×J blocks (step 950); for each I×J block, modifying at least a predetermined bit of the image block (step 952), wherein the modified image is $\underline{X}_r$; calculating a digest of the values using a cryptographic hash function (step 954); combining the hashed output calculated in the previous step with a watermark $B_r$ (step 956), wherein the output of the step of combining the hashed output with a watermark $B_r$ is a combined image $C_r$; encrypting the combined image $C_r$ (step 958), wherein the encrypted image is $W_r$; and incorporating the value $W_r$ into the modified image block is $\underline{X}_r$.

Similar to the methodology described for watermark insertion for a secret key system, we let $X_r$ denotes the rh block of data within the image $x_{m,n}$. Next, a corresponding block $\underline{X}_r$ is formed where each element in $\underline{X}_r$ equals the corresponding element in $X_r$ except that a predetermined bit (the least significant bit) is set to a predetermined value zero. H(·) be a cryptographic hash function such as the MD5 algorithm. The hash function is computed as follows:

$$H(M, N, \underline{X}_r) = (p'_1, p'_2, \ldots, p'_s)$$

where $p'_i$ denotes the output bits from the hash function, and s is size of the output bits that is dependent on the specific hash function used. For example, s=128 for MD5.

Denoting the first IJ bits from the bit stream $P_r$, i.e., $$Pr = \underline{\Delta}(p'_1, p'_2, \ldots, p'_{IJ}).$$

$P_r$ is combined with a corresponding block $B_r$ in $b_{m,n}$ using a bitwise logic function, typically an exclusive or function.

That is, we compute $C_r = P_r \oplus B_r$ where G denotes the element-wise exclusive OR operation between the two blocks. Finally we encrypt $C_r$ with a public key cryptographic system to give $$W_r = E_{K'}(C_r)$$

where E(·) is the encryption function of the public key system, and K' is the private key. The binary block of data $W_r$ is then embedded into the least significant bit of the data block $\underline{X}_r$ to form a block $Y_r$ in the watermarked image.

Figure 10B:
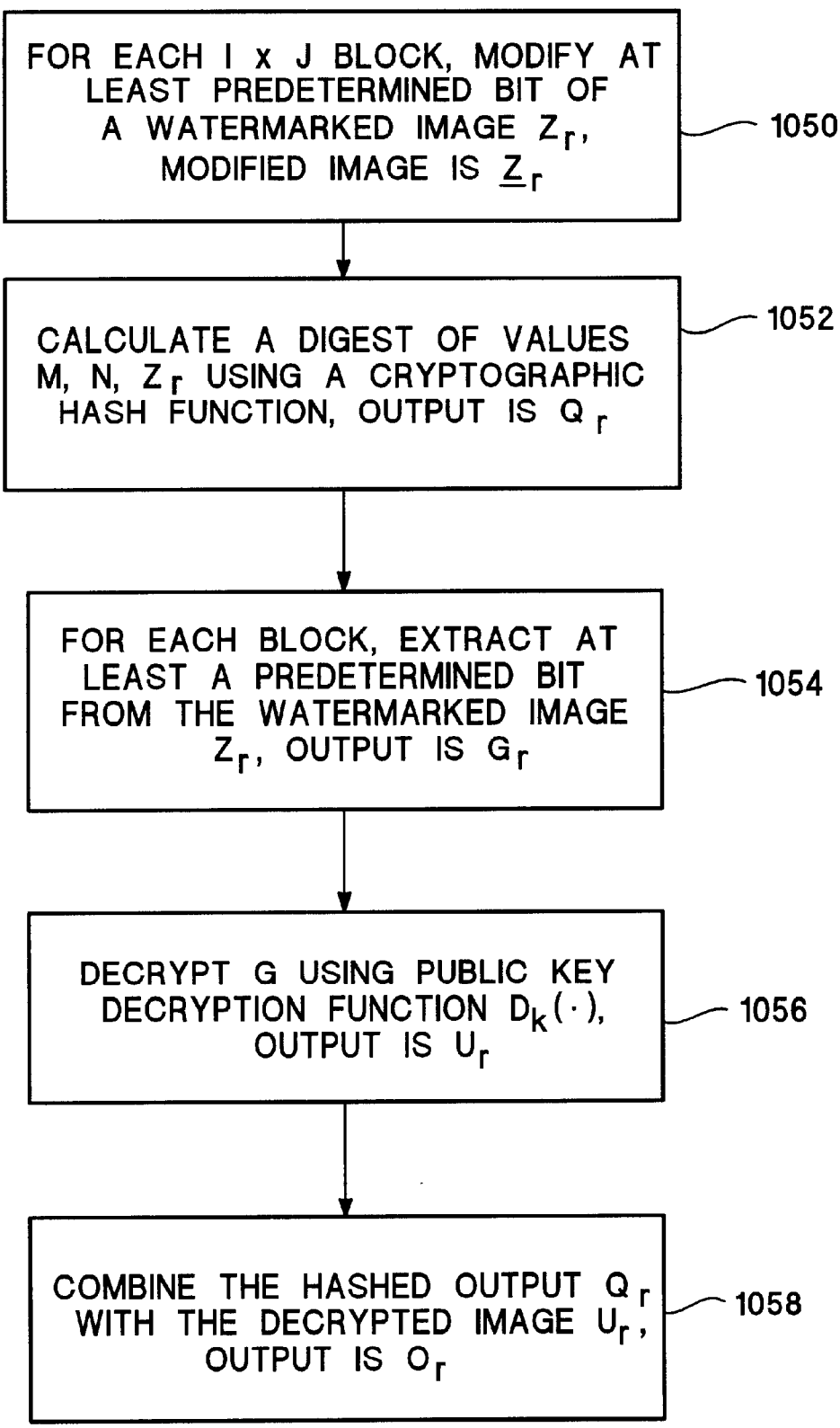
FIG. 10B shows a block diagram of the watermark extraction methodology that is used in combination with the insertion methodology shown in FIGS. 9A and 9B.

FIG. 10A shows a block diagram of the watermark extraction methodology that is used in combination with the insertion methodology shown in FIGS. 9A and 9B. FIG. 10B shows a flowchart of the watermark extraction methodology used in FIG. 10A. The apparatus shown in FIG. 10A includes: a means for modifying 1010 at least a predetermined bit of a block of the watermarked image $Z_r$ to a predetermined value, wherein the modified image block is $\underline{Z}_r$; a means for extracting 1018 a predetermined bit from the image $Z_r$; a means for calculating a digest of values 1012 using a cryptographic hash function, wherein the means for modifying 1010 at least a predetermined bit is electrically coupled to the means for calculating a digest of values 1012; a public key decryption means 1020, wherein the output of the public key decryption means is a decrypted image block $U_r$, wherein the public key decryption means 1020 is electrically coupled to the means f6r extracting 1018; and a means for combining 1016 the hashed output value with the decrypted image block $U_r$, wherein the means for combining the hashed output with the modified image block $\underline{Z}_r$ is electrically coupled to the public key decryption means 1020 and the means for calculating a digest of values 1012.

In the extraction procedure, the image block $Z_r$ is used to create two different images. In the preferred embodiment, the first image $G_r$ contains the least significant bits, and the other image $\underline{Z}_r$ contains the pixel values except that the least significant bits have been zeroed out. We then calculate the hash of M, N and $\underline{Z}_r$, and denote the first IJ bits of the output by $Q_r$. We use a public key decryption algorithm to decrypt $G_r$ with the public key K that corresponds to the private key K' used in the watermark insertion procedure. That is, we calculate $$U_r = D(G_r).$$

Finally, we compute the output block $O_r = Q_r \oplus U_r$ using an element-wise exclusive or procedure.

In our implementation of the public key watermark insertion and extraction procedures, we used the MD5 as our hash function, and the RSA public key encryption algorithm for encryption and decryption. If both the watermarked image block and the image size had not been changed since the insertion of a watermark, i.e. if $Z_r = Y_r$, then , $\underline{Z}_r = \underline{X}_r$ and $G_r = W_r$. This implies $P_r = Q_r$ and $U_r = C_r$. Hence the output binary image $O_r$ is identical to the block $B_r$. Otherwise, this will not be the case and the output block $O_r$ will appear similar to random noise due to the nature of the hash function. As a result, this algorithm can detect any change to the pixel values to the block level.

FIG. 10A shows a block diagram of the watermark extraction methodology that is used in combination with the insertion methodology shown in FIGS. 9A and 9B. Referring to 10B shows a method of extracting a watermark from a digital image $Y_r$, for a public key encryption system, including the steps of: for each I×J block, modifying at least a predetermined bit of the watermarked image $Z_r$ to a predetermined value (step 1050), wherein the modified watermarked image $Z_r$ is $\underline{Z}_r$; extracting at least a predetermined bit from the watermarked image $\underline{Z}_r$, wherein the extracted image block (step 1054) is $G_r$; calculating a digest of the values using a cryptographic hash function (step 1052); decrypting $G_r$ using a public key decryption function $D_k(·)$, wherein the decrypted image block is $U_r$; and combining the hashed output with the decrypted image block $U_r$.

Figure 11:
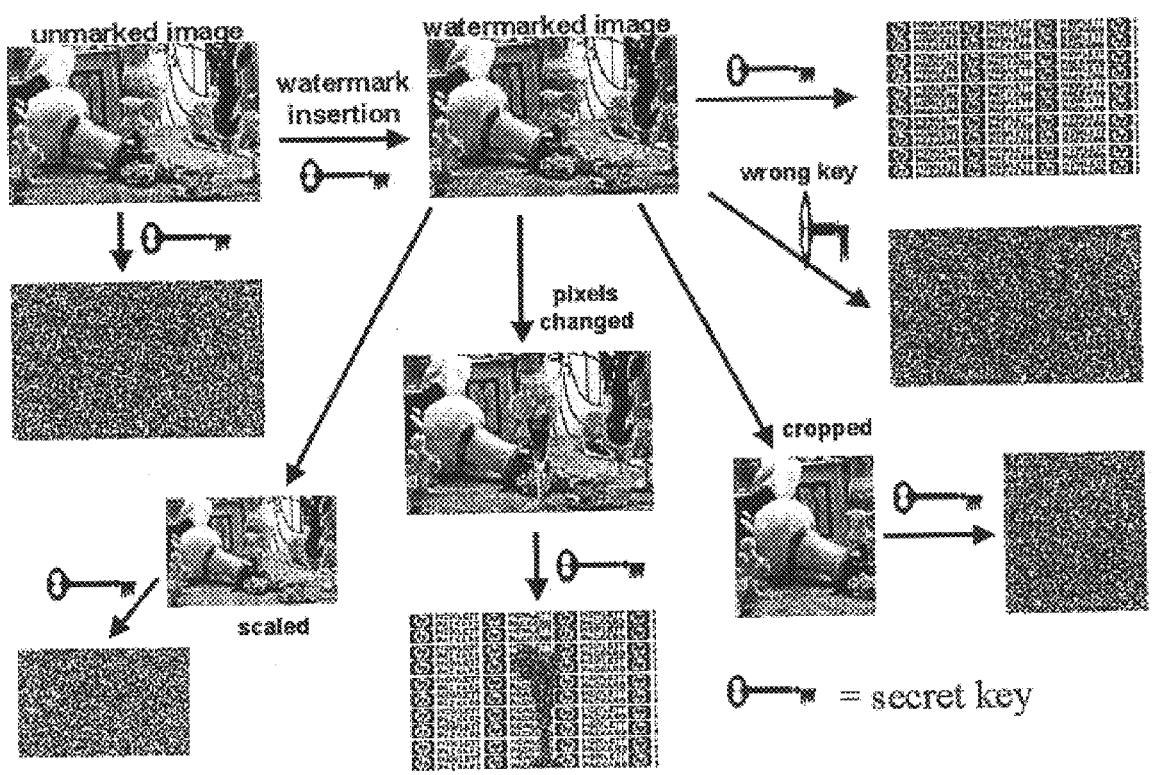
FIG. 11 shows a summary of the experimental results summarizing the properties of the secret key verification methodology shown in FIGS. 1A and 1B.
Figure 12:
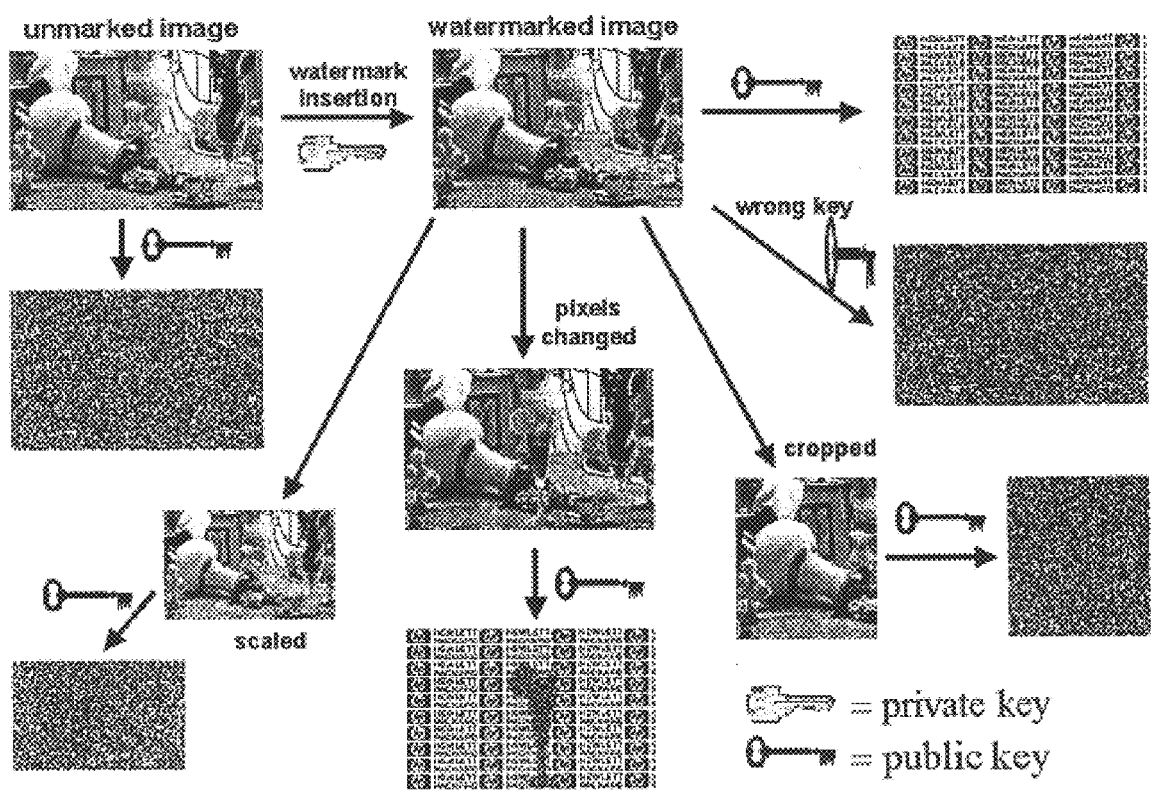
FIG. 12 shows a summary of the experimental results summarizing the properties of the public key verification methodology shown in FIGS. 9A and 9B.

FIG. 11 shows a summary of the experimental results summarizing the properties of the secret key verification methodology shown in FIGS. 1A, 1B. Similarly, FIG. 12 shows a summary of the experimental results summarizing the properties of the public key verification methodology shown in FIGS. 9A, 9B. Referring to FIGS. 11 and 12, one way to accomplish ownership verification is to associate a user key with a watermark so that the desired watermark can only be extracted from a watermarked image with the appropriate user key. If the user performs the watermark extraction procedure using either an incorrect key or with an image that was not watermarked, the user obtains an image that resembles random noise.

The block diagrams and flowcharts shown in FIGS. 1A, 1B, 1C, 2A, 2B, 9A, 9B, 10A, and 10B may be implemented in either hardware or in software or a combination of both. For example, referring to the block diagram in FIG. 1A, the computation of the hash function (calculating a digest of values) could implemented in software, while the exclusive OR function 116 and the modification of a predetermined bit of the image block could be performed in hardware. Alternatively, in another embodiment, the implementation of the block diagram shown in FIG. 1A could be implemented entirely in software, wherein the software is stored on a computer readable media and is adapted to running on a computer system.

Figure 13:
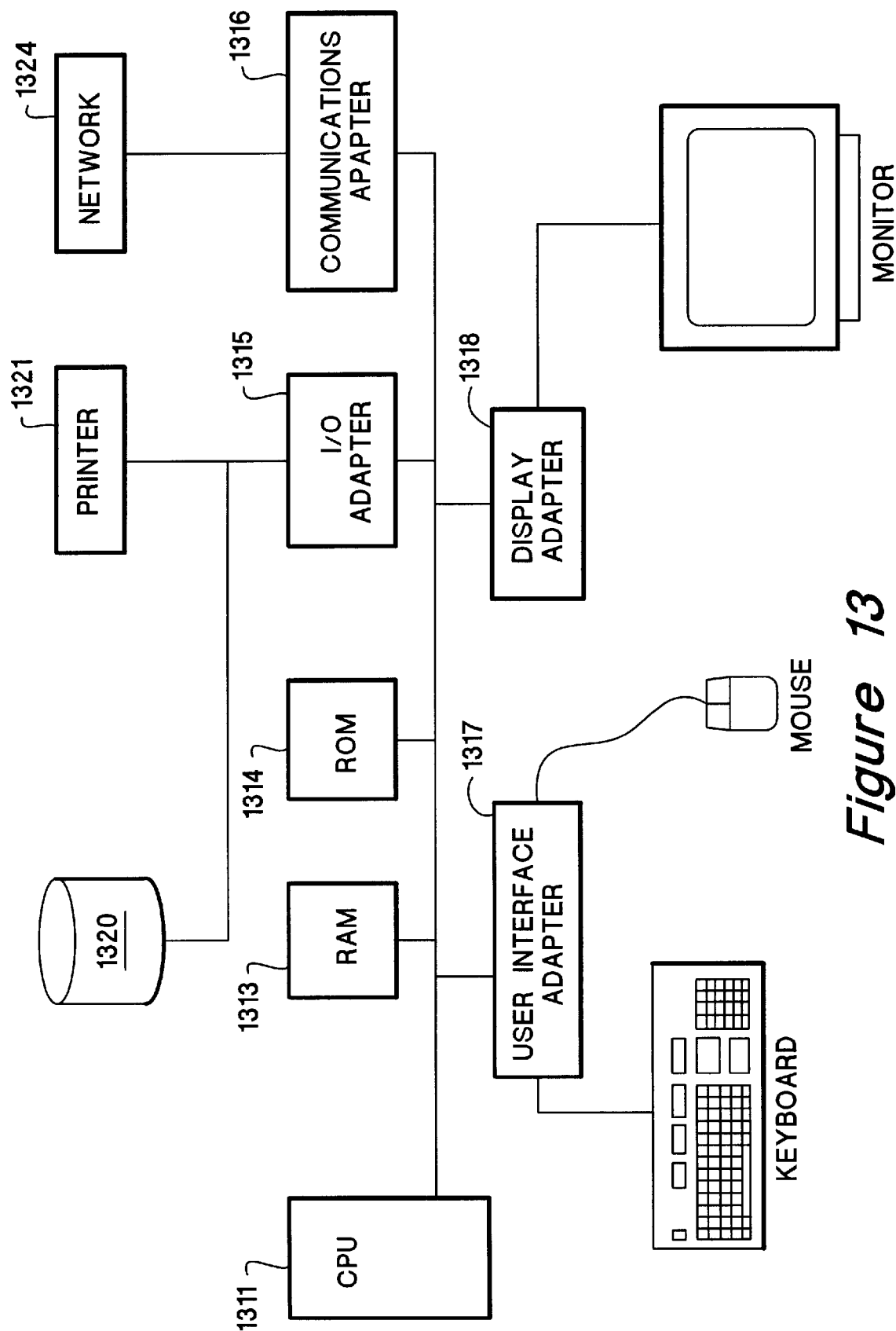
FIG. 13 shows a high-level block diagram of a computer system adapted to execute a software program implementing the steps of the watermark insertion methodology according to the present invention.

FIG. 13 shows a high-level block diagram of a computer system adapted to execute a software program implementing the steps of the watermark methodology according to the present invention. Central processing unit (CPU) 1311 is coupled to a bus 1312 which in turn is coupled to random access memory (RAM) 1313, read only memory (ROM) 1314, input/output (I/O) adapter 1315, a communications adapter 1316, user interface adapter 1317, and display adapter 1318. RAM 1313 and ROM typically hold user and system data and programs. Typically, a software program implementing the present invention will reside on a storage medium and will execute on the CPU.

It is understood that the above description is intended to be illustrative and not restrictive. For example, the present invention provides watermarking technique for embedding a digital identifier into an image $X_{m,n}$ of M×N pixels, to form a watermarked image $Y_{m,n}$ of the same size. In an alternative embodiment, the watermarked image is a different size than the image $X_{m,n}$. The scope of the invention should therefore be determined with reference to the appended claims, along with the full scope of equivalents to which such claims are entitled.

What is claimed is:

1. An electronic system for inserting a watermark into a digital image, comprising:
    means for modifying at least one predetermined bit within an image block $X_r$ to a predetermined value, wherein the modified image block is $\underline{X}_r$;
    means for calculating a digest of values using a cryptographic hash function, wherein a user key, an image width, an image height and the modified image block are inputs to the means for calculating a digest of values, wherein the output of the means for calculating a digest of values is a hashed output, wherein the means for modifying at least one predetermined bit of the image block is electrically coupled to the means for calculating a digest of values;

means for combining the hashed output with a watermark, wherein the means for combining uses a pixel by pixel exclusive OR logic operation, wherein the means for combining the hashed output with a watermark is electrically coupled to the output of the means for calculating a digest of values, wherein the output of the means for combining is a combined image block $C_r$; and means for inserting a first image block into the modified image block $\underline{X}_r$, wherein the means for inserting the first image block into the modified image block $\underline{X}_r$, is electrically coupled to the means for modifying at least one predetermined it of the image block.

2. The electronic system recited in claim 1 wherein the first image block is the combined image block $C_r$.

3. The electronic system recited in claim 2 wherein the means for combining the hashed output with a watermark is electrically coupled to the means for inserting the first image block into the modified image block $\underline{X}_r$.

4. The electronic system recited in claim 1 wherein the first image block is an encrypted image block $W_r$.

5. The electronic system recited in claim 4 further including an encryption means, wherein the encryption means is electrically coupled to both the means for combining the hashed output with a watermark and the means for inserting a first image block into the modified image block $X_r$.

6. The electronic system recited in claim 1 wherein the means for modifying at least a predetermined bit to a predetermined value modifies the at least one predetermined bit independently for each color plane of the image block.

7. An electronic system for inserting a watermark into a digital image, comprising:

means for modifying at least one predetermined bit within an image block $X_1$, to a predetermined value, wherein the modified image block is $\underline{X}_r$;

means for calculating a digest of values using a cryptographic hash function, wherein a user key, an image width, an image height and the modified image block are inputs to the means for calculating a digest of values, wherein the means for calculating a digest of values is a hashed output, wherein the means for modifying at least one predetermined bit of the image block is electrically coupled to the means for calculating a digest of values wherein the means for modifying at least one predetermined bit modifies the LSB within the image block $X_r$;

means for combining the bashed output with a watermark, wherein the means for combining uses a pixel by pixel XOR logic block, wherein the means for combining the hashed output with a watermark is electrically coupled to the means for calculating a digest of values, wherein the output of the means for combining is a combined image block; and means for inserting a first image block into the modified image block $\underline{X}_r$, wherein the means for inserting the first image block into the modified image block $\underline{X}_r$ is electrically coupled to the means for modifying at least one predetermined bit of the image block.

8. An electronic system for extracting a watermark from a digital watermarked image comprising means for modifying at least a predetermined bit within an image block of the watermarked image to a predetermined value;

means for extracting at least a predetermined from the watermarked image block;

means for calculating a digest of values using a cryptographic hash function, wherein a user key, an image width, an image height and the modified image block are inputs to the means for calculating a digest of values, wherein the output of the means for calculating a digest of values using a cryptographic hash function is a hashed output, wherein the means for modifying at least a predetermined bit of the watermarked image is electrically coupled to the mans for calculating a digest of values;

means for combining, wherein the means for combining is electrically coupled to the output of the means for calculating a digest of values, wherein the means for combining uses a pixel by pixel exclusive OR logic operation.

9. The electronic system recited in claim 8 wherein the means for combining is electrically coupled to the means for extracting at least a predetermined bit from the watermarked image block.

10. The electronic system recited in claim 8 further including a decryption means, wherein the decryption means is electrically coupled to the means for extracting at least a predetermined bit from the watermarked image block and the means for combining.

11. An electronic system for extracting a watermark from a digital watermarked image comprising:

means for modifying at least a predetermined bit within an image block of the watermarked image to a predetermined value;

means for extracting at least a predetermined bit from the watermarked image block;

means for calculating a digest of values using a cryptographic hash function, wherein a user key, an image width, an image height and the modified image block are inputs tot he means for calculating a digest of values, wherein the output of the means for calculating a digest of values using a cryptographic hash function is a hashed output, wherein the means for modifying at least a predetermined bit of the watermarked image is electrically coupled to the means for calculating a digest of values wherein the means for modifying at least a predetermined bit to a predetermined value modifies the least significant bit of the selected group of pixels within the image block; and means for combining, wherein the means for combining is electrically coupled to the means for calculating a digest of values, wherein the means for combining uses a pixel by pixel exclusive OR logic operation.

12. A method for inserting a watermark into a digital image including the steps of:

partitioning an image block $X_r$ into at least one non-overlapping I×J block:

for each I×J block, modifying at least a predetermined bit of each I×J block to a predetermined value, wherein the modified image block is $\underline{X}_r$;

calculating a digest of the values using a cryptographic hash function wherein a user key, an image width, an image height and the modified image block are inputs to the means it, for calculating a digest of values;

combining the hashed output calculated in the previous step with a watermark bitmap $B_r$, using a pixel by pixel exclusive or logic operation, wherein the output of the step of combining the hashed output with a watermark $B_r$ is a combined image block $C_r$; and inserting a first image block into the modified image $\underline{X}_r$.

13. The method recited in claim 12 wherein the first image block is the combined image block $C_r$.

14. The method recited in claim 12 wherein the first image block is an encrypted image block $W_r$.

15. The method recited in claim 12 further including the step of encrypting the combined image block, wherein the result of encrypting the combined image block is the encrypted image block $W_r$.

16. The method recited in claim 12 wherein the at least one predetermined bit of the image block $\underline{X}_r$ is modified by discarding the predetermined bit.

17. The method recited in claim 12 wherein for the step of modifying at least one predetermined bit of the image block $X_r$ a plurality of bits are modified by setting the plurality of bits to predetermined values.

18. The method recited in claim 12 wherein the predetermined bit modified is the LSB within image block $X_r$.

19. A method for extracting a watermark into a digital image including the steps of:
   for each partitioned non-overlapping I×J block of a watermarked image $X_r$, modifying at least a predetermined bit of each I×J block to a predetermined value, wherein the modified image block is $Z_r$;
   calculating a digest of the values using a cryptographic hash function, including providing a user key, an image width, an image height and the modified image block input to the means for calculating a digest of values;
   for each I×J block, extracting at least a predetermined bit from the watermarked image $X_r$;
   decrypting the output of the previous step using a public key decryption function,
   combining the output of the cryptographic hash function with the decrypted image of the previous step, including using a pixel by pixel exclusive OR logic operation.

20. The method recited in claim 19 wherein the predetermined bit modified is the LSB within image block $X_r$.

21. An electronic system for inserting a watermark into a digital image, comprising:
   a system for modifying at least one predetermined bit within an image block $X_r$ to a predetermined value, wherein the modified image block is $\underline{X}_r$;
   a system for calculating a digest of values using a cryptographic hash function, wherein a user key, an image width, an image height and the modified image block are inputs to the means for calculating a digest of values, wherein the output of the system for calculating a digest of values is a hashed output, wherein the system for modifying at least one predetermined bit of the image block is electrically coupled to the system for calculating a digest of values;
   a system for combining the hashed output with a watermark, wherein the system for combining uses a pixel by pixel exclusive OR logic operation, wherein the system for combining the hashed output with a watermark is electrically coupled to the output of the system for calculating a digest of values, wherein the output of the system for combining is a combined image block $C_r$; and
   a system for inserting a first image block into the modified image block $\underline{X}_r$, wherein the system for inserting the first image block into the modified image block $\underline{X}_r$ is electrically coupled to the system for modifying at least one predetermined bit of the image block.

22. The electronic system recited in claim 21, wherein the first image block is the combined image block $C_r$.

23. The electronic system recited in claim 21, wherein the first image block is an encrypted image block $W_r$.

24. The electronic system recited in claim 21, wherein the system for combining the hashed output with a watermark is electrically coupled to the system for inserting the first image block into the modified image block $\underline{X}_r$.

25. An electronic system for inserting a watermark into a digital image, comprising;
   a system for modifying at least one predetermined bit within an image block $X_r$ to a predetermined value, wherein the modified image block is $\underline{X}_r$;
   a system for calculating a digest of values using a cryptographic hash function, wherein a user key, an image width, an image height and the modified image block are inputs to the system for calculating a digest of values, wherein the system for calculating a digest of values is a hashed output, wherein the system for modifying at least one predetermined bit of the image block is electrically coupled to the system for calculating a digest of values wherein the system for modifying at least one predetermined bit modifies the LSB within the image block $X_r$;
   a system for combining the hashed output with a watermark, wherein the system for combining uses a pixel by pixel XOR logic block, wherein the system for combining the hashed output with a watermark is electrically coupled to the system for calculating a digest of values, wherein the output of the system for combining is a combined image block; and
   a system for inserting a first image block into the modified image block $\underline{X}_r$, wherein the system for inserting the first image block into the modified image block $\underline{X}_r$ is electrically coupled to the system for modifying at least one predetermined bit of the image block.

26. The electronic system recited in claim 25, wherein the system for modifying at least a predetermined bit to a predetermined value modifies the at least one predetermined bit independently for each color plane of the image block.

27. The electronic system recited in claim 25, further including an encryption system, wherein the encryption system is electrically coupled to both the system for combining the hashed output with a watermark and the system for inserting a first image block into the modified image block $\underline{X}_r$.

28. An electronic system for extracting a watermark from a digital watermarked image comprising:
   a system for modifying at least a predetermined bit within an image block of the watermarked image to a predetermined value;
   a system for extracting at least a predetermined bit from the watermarked image block,
   a system for calculating a digest of values using a cryptographic hash function, wherein a user key, an image width, an image height and the modified image block are inputs to the system for calculating a digest of values, wherein the output of the system for calculating a digest of values using a cryptographic hash function is a hashed output, wherein the system for modifying at least a predetermined bit of the watermarked image is electrically coupled to the system for calculating a digest of values; and
   a system for combining, wherein the system for combining uses a pixel by pixel exclusive OR logic operation, wherein the system for combining is electrically coupled to the output of the system for calculating a digest of values.

29. The electronic system recited in claim 28, wherein the system for combining is electrically coupled to the system for extracting at least a predetermined bit from the watermarked image block.

30. The electronic system recited in claim 28, further including a decryption system, wherein the decryption system is electrically coupled to the system for extracting at least a predetermined bit from the watermarked image block and the system for combining.

31. An electronic system for extracting a watermark from a digital watermarked image comprising:

- a system for modifying at least a predetermined bit within an image block of the watermarked image to a predetermined value;
- a system for extracting at least a predetermined bit from the watermarked image block;
- a system for calculating a digest of values using a cryptographic hash function, wherein a user key, an image width, an image height and the modified image block are inputs to the system for calculating a digest of values, wherein the output of the system for calculating a digest of values using a cryptographic hash function is a hashed output, wherein the system for modifying at least a predetermined bit of the watermarked image is electrically coupled to the system for calculating a digest of values, wherein the system for modifying at least a predetermined bit to a predetermined value modifies the least significant bit within the image block; and
- a system for combining, wherein the system for combining uses a pixel by pixel exclusive OR logic operation, wherein the system for combining is electrically coupled to the system for calculating a digest of values.

* * * * *